May 16, 1967 R. L. WATTERS 3,320,533

HYBRID ELECTROMETER AMPLIFIER HAVING PROTECTIVE MEANS IN FEEDBACK PATH TO LIMIT POSITIVE EXCURSIONS OF NEGATIVE FEEDBACK SIGNAL

Filed May 11, 1964

Inventor:
Robert L. Watters,
by John F. Ahern
His Attorney.

United States Patent Office 3,320,533
Patented May 16, 1967

3,320,533

HYBRID ELECTROMETER AMPLIFIER HAVING PROTECTIVE MEANS IN FEEDBACK PATH TO LIMIT POSITIVE EXCURSIONS OF NEGATIVE FEEDBACK SIGNAL

Robert L. Watters, Schenectady, N.Y., assignor to General Electric Company, a corporation of New York
Filed May 11, 1964, Ser. No. 366,504
6 Claims. (Cl. 324—123)

Figure 1:
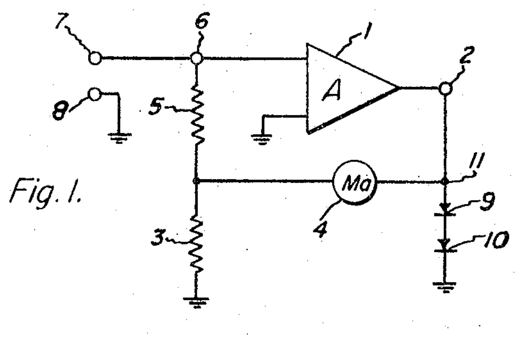

The present invention relates generally to electronic circuits and apparatus that amplify and measure extremely weak electric currents and, more particularly, pertains to circuits for this purpose which are capable of sustained accuracy and dependability even though turned "on" and "off" many times and left without maintenance or adjustment for periods as long as several years or more.

This invention is an improvement over my copending patent application Ser. No. 297,027, filed July 23, 1963, entitled, "Micro-Microammeter," and assigned to the assignee of the present invention. The direct current amplifier circuit shown and described in this parent application is of the general type to which the present invention relates and is in part the source from which the teachings to be fully set forth in the ensuing description flow. Accordingly, the complete disclosure of this parent application is incorporated by reference into the present application as though repeated below, although, in the interests of clarity of presentation and conciseness, only the portions helpful in gaining a full appreciation of the present invention will be set forth again in detail wherever needed.

There is an increasingly growing demand for electronic circuits and apparatus that are adapted to amplify and measure extremely weak electric currents. This demand is caused partially by the greater number of applications where known devices characterized by small signals are required (for example, ion gauges now are used commonly as pressure gauges), and partially by the advent of new devices characterized by small signals, as semiconductor radiation sensors. Often the weak electric currents that are to be amplified into correspondingly more powerful electric signals contain a component that changes slowly with time, and an amplifier capable of amplifying direct current is required.

The simplest and most economical direct current amplifier is the type in which a number of single direct current amplifying stages are successively directly coupled together, as links in a chain, to provide progressive amplification of a weak current applied to the input of the initial stage. Typically, the output signal of such an amplifier is coupled back to the input of the initial stage in such a manner as to oppose, and preferably substantially cancel or "null-balance," the weak current to be measured. This type of coupling back is known as negative feedback. By decreasing the effect of the feedback signal upon the output of the initial stage by a known amount, as contrasted with the effect of the weak current to be measured upon the output of the initial stage, the amplifier is forced to supply a strong feedback signal to null-balance a relatively weak current. Measurement of the magnitude of the feedback signal is then used to provide a convenient indication of the magnitude of the weak current.

In spite of the many advantages to be gained by using simple directly coupled, direct curent amplifiers to measure weak currents as set forth above, it is well-known in the art that such amplifiers are rarely used except in cases where careful, tedious manual setting and adjustment is possible, at least every time that the amplifier is turned "on," or energized. This is due in part to the fact that slight changes in operation of the initial stage, from prior operating conditions, introduce error signals into the amplifier that are indistinguishable from signals caused by the weak current to be measured. Thus, such error signals must be eliminated by manual adjustment each time the amplifier is energized before accurate results are obtained.

A particularly desirable amplifier for use in measuring weak currents is the hybrid direct coupled amplifier. The amplifier is denominated a hybrid because the initial stage employs an electrometer-type vacuum discharge amplifying device and succeeding stages employ semiconductor amplifying devices, as transistors. The electrometer-type device is characterized by an extremely high input resistance, as required to avoid absorbing appreciable energy from the source of weak current to be measured and thereby destroying the effectiveness of the weak current, and usually performs with low electrode potentials that do not exceed 10 volts. The similar low voltage requirements of transistors render these devices particularly compatible for use in succeeding stages of the amplifier and, normally, only a single transistor per succeeding stage is required.

For use in measuring weak currents, as well as for many other similar purposes, it would be advantageous to have a directly coupled, direct current, negative feedback amplifier that is reliable and accurate for long periods of time and does not require manual re-adjustment even though subjected to energization characterized by continual interruptions. Preferably the amplifier is of the hybrid type described above and the transistor stages each require only a single transistor amplifying device.

Accordingly, it is an object of my invention to provide a directly coupled, direct current amplifier having negative feedback and featuring improved reliability when subjected to intermittent operation.

Another object of my invention is to provide a weak current measuring apparatus including a direct current hybrid amplifier having negative feedback and featuring sustained accuracy even when subjected to intermittent operation.

Another object of my invention is to provide an improved directly coupled, direct current, negative feedback amplifier.

Briefly, I have discovered that when means are provided to limit the voltage excursion of the negative feedback signal at least during a short interval after de-energization, the hybrid, directly coupled, direct current amplifier becomes a reliable tool for measuring weak currents even though subjected to intermittent energization. In the usual case where high current, low voltage, negative feedback is employed, the limiting is readily accomplished by using a semiconductor diode with its anode connected to a point in the feedback path and its cathode connected to ground.

Figure 2:
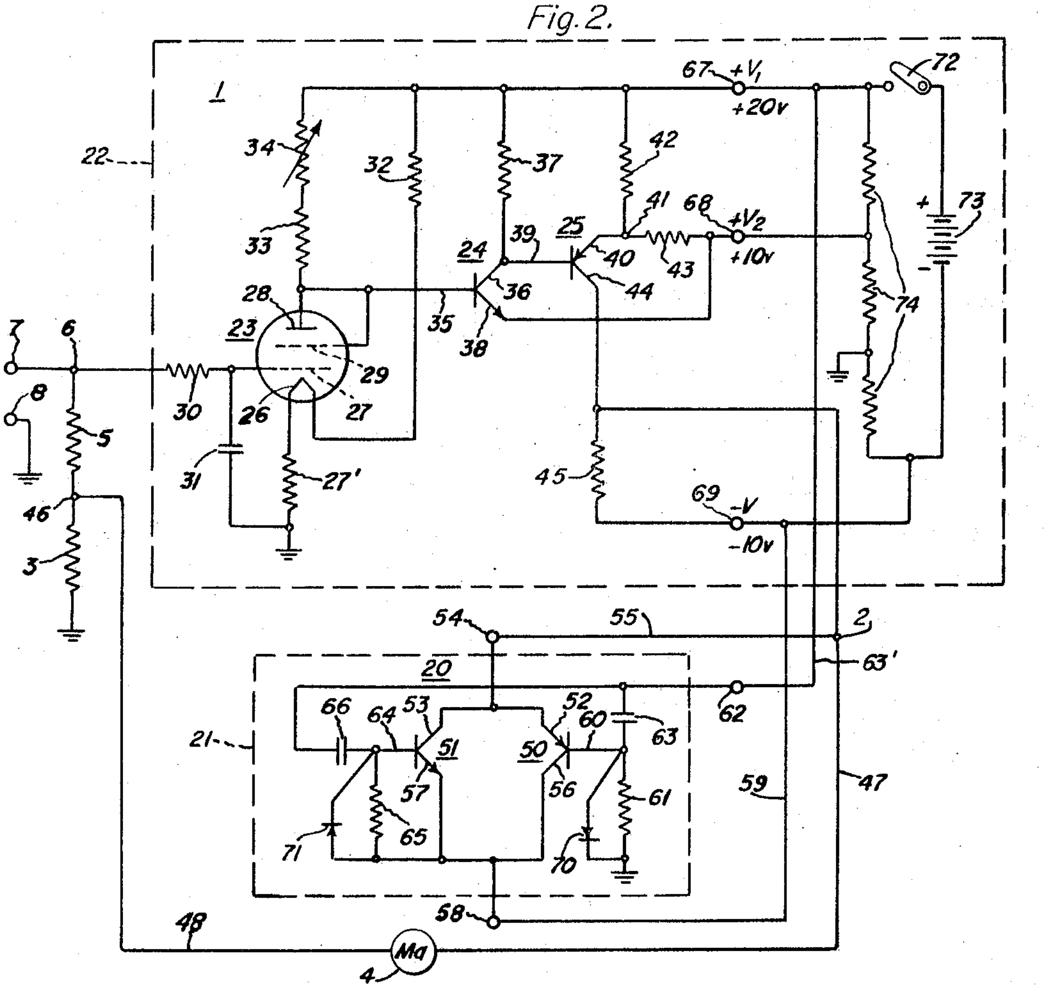

The features of my invention that I believe to be novel are set forth with particularity in the appended claims. My invention itself, however, both as to its organization and method of operation, together with further objects and advantages thereof, may best be understood by reference to the following description taken in connection with the accompanying drawing in which:

FIGURE 1 is a schematic diagram of a circuit for measuring electric current in accord with the invention; and, FIGURE 2 is a detailed schematic circuit diagram of a circuit for measuring currents in accord with another embodiment of my invention.

I have discovered that, in general, when means are provided to limit the voltage excursion of the negative feedback signal in such amplifiers at least during a short interval after de-energization, the hybrid, directly coupled, direct current amplifier becomes a reliable tool for measuring weak currents even though subjected to intermittent energization.

The following explanation of the theory that is presently thought to be responsible for operation of the present invention is offered, though it is to be understood that the invention is in no way conditioned upon the correctness thereof. As mentioned above, the present state of the art requires that the initial stage of a direct current amplifier intended to receive weak signals (in the order of $10^{-10}$ amperes and less) be an electron discharge device. Normally, the device is a special, low voltage variety known in the art as an electrometer input amplifying device, oftentimes referred to as an electrometer tube. Such devices include a thermionic electron emissive cathode that normally releases free electrons at a predetermined essentially constant continuous rate, an anode or electron collector adapted to attract free electrons from the cathode at a rate that can exceed the rate at which electrons are released from the cathode, and a control electrode that limits the rate at which electrons are attracted from the cathode when the electric potential of the control electrode is less than the electric potential of the cathode.

In such devices, when the control electrode is permitted to assume a potential that is positive with respect to the cathode, even for an extremely short interval, electrons are attracted from the cathode to the anode electrode at a rate that effects an undesirable semi-permanent change in the electron emissive characteristics of the cathode. When the aforementioned unfortunate condition is permitted to exist for even a fraction of a second, the characteristics of the device are changed to the extent that the current flowing from the cathode to the electron collector, for any given normal control electrode potential, changes and is not restored until several hundred hours of operation, if at all. This is true even though the amplification factor of the device may not be deleteriously affected.

In the directly coupled amplifiers of the type to which the present invention relates, succeeding stages are unable to distinguish between the component of current that is controlled by the input signal to be measured and the component attributable to the undesirable semi-permanent change in the rate of electron emission from the cathode. Thus, the benefit of previous calibration of the amplifier is lost and accuracy of measurement destroyed.

In the usual direct-current amplifier wherein the amplifying devices are all vacuum electron discharge devices, some transient voltages are established when the amplifier is de-energized, or turned "off," but, essentially, the various devices substantially simultaneously coast to a stop in a gradual manner that permits a circuit design wherein future calibration and performance of the amplifier is not significantly impaired. In the hybrid amplifier, however, one or more subsequent stages utilize semiconductor amplifying devices, as transistors, that respond substantially instantaneously to energization or de-energization, particularly as contrasted with the much slower rate of response of electron emissive evacuated amplifying devices, as electrometer tubes. In hybrid amplifiers, of the type to which the present invention relates, wherein all, or essentially all, of the amplifier output is returned to the input of the initial stage in the form of negative feedback, any sudden positive excursion of the feedback signal immediately subsequent to de-energization tends to render the control electrode of the electrometer tube positive with respect to its cathode and to cause the aforementioned deleterious effect upon the cathode during the interval required for the cathode of the electrometer to cool off and the power supply voltage applied thereto to decay.

The likelihood of such positive excursion of the negative feedback signal is greatly increased when the semiconductor amplifying device stages are of the more economical type comprising only a single transistor each, rather than the more complex stages including a plurality of semiconductor amplifying devices. In the latter case frequently, the semiconductor amplifying devices are connected in a balanced arrangement that tends to rapidly reduce the feedback signal to a negligible value of zero, whereas this is not the case in the more economically desirable single device stages having fewer components and resultant greater dependability.

Thus, the present invention features a direct current, directly coupled amplifier of the hybrid type having means to limit positive excursions of a negative feedback signal. In a preferred embodiment of the invention, the initial stage includes an electrometer tube and subsequent stages each feature only a single semiconductor amplifying device. Such an amplifier can be continuously intermittently energized and will rapidly assume its prior operating characteristics to a high degree of precision.

FIGURE 1 illustrates an electrometer circuit in accord with the present invention which is suitable for use in measuring extremely weak currents. The circuit includes a substantially linear, inverting, direct-current amplifier 1 that is, preferably, of the hybrid directly coupled type described above. Amplifier 1 has an output terminal 2 which is connected to an impedance means, as resistor 3, through a current indicator 4. A signal feedback resistor 5 is similarly connected from indicator 4 to amplifier input terminal 6. The electrometer input terminals 7 and 8 are arranged to be connected to a source of current to be measured.

It is desired that the feedback path including resistor 5 introduce negative feedback from amplifier output terminal 2 to amplifier input terminal 6. To this end, amplifier 1 is selected to provide a complete phase reversal, or inversion, between its input and output, as is well-known in the art.

Amplifier 1 of FIGURE 1 is selected to provide a high gain, preferably in excess of 100, so that the ratio of current through current indicator 4 to the current at input terminals 7 and 8 is substantially independent of the gain of amplifier 1 and depends essentially upon the resistance value of resistor 5 and the resistance value of resistor 3. By selecting resistor 5 to be many orders of magnitude greater in resistance value than resistor 3, the current flowing through indicator 4 is made many orders of magnitude greater than the current at terminals 7 and 8 and equal to the input current multiplied by the resistance ratio between resistor 5 and resistor 3.

Frequently, a plurality of input current ranges are provided by having a plurality of resistors of differing resistance values and switching means to selectively insert resistors of particular desired values corresponding to any desired range. In this way, the ratio between the input current at terminals 7 and 8 and the current through indicator 4 conveniently may be varied to provide a large number of ranges with a single amplifier 1 and indicator 4.

In accordance with the present invention, protective means are connected to the negative feedback path and adapted to limit excursions of the negative feedback signal in the positive direction at least during transient intervals when amplifier 1 is energized or de-energized. In FIGURE 1, such protective means for the input of amplifier 1 take the form of diodes 9 and 10 that are connected between point 11 and the ground, or reference potential, for the circuit. The diodes are asymmetrically conductive devices and are connected to become conductive when the feedback voltage exceeds a predetermined positive potential with respect to ground. This is effected by connecting the anode of diode 9 to point 11 and the cathode of diode 9 to ground through diode 10 that is similarly poled thereto. That is to say, the cathode of diode 9 is connected to the anode of diode 10 and the cathode of diode 10 is connected to ground.

The number of diodes connected in series in this way varies in accord with the desirable positive voltage excursion of the feedback signal, and varies in typical cases from 1 to 5. Also, the number of diodes selected depends upon the characteristics of the particular diode used. For example, one semiconductor silicon diode is conveniently utilized for each approximately 0.5 volt increment of permissible positive voltage excursion, and a semiconductor germanium diode is conveniently selected for each approximately 0.3 volt positive voltage excursion. These respective semiconductor-type diodes are continuously ready for operation and can be considered essentially open circuits insofar as electrometer circuits of the type shown in FIGURE 1 are concerned when the individual voltage increments are less in magnitude than the aforementioned values and they rapidly become substantially short circuits for higher values.

Usually the resistance value of resistor 3 is relatively low, in the order of 1000 ohms or less, and the resistance value of resistor 5 is usually in the range of from $10^6$ to $10^{13}$ ohms. Consequently, the voltage excursions of the feedback signal are ordinarily much lower during normal operation than required to cause significant conduction even when only one or two of either of the aforementioned type diode is used.

FIGURE 2 illustrates, in detail, a specific hybrid, direct-current, directly coupled amplifier 1, generally indicated within dashed line enclosure 22, that is of the general type to which the present invention relates. More specifically, amplifier 1 includes an initial stage having an evacuated voltage amplifying device 23 and succeeding stages each having only a single active amplifying element of the semiconductor type, as transistors 24 and 25.

The successive amplifier stages are directly coupled. This is to say that the inputs of succeeding stages are either directly connected to their respective preceding stages or connected through resistance voltage dividers, zener diodes, or the like, such that no isolation between the signal current and quiescent current occurs as in the case of amplifiers wherein stages are coupled through capacitors or transformers.

Electron discharge voltage amplifying device 23 is advantageously selected to exhibit an extremely high input impedance and includes an electron-emissive cathode 26, a control electrode 27 and an anode, or electron collector, 28. Electrometer amplifying devices are generally to be preferred in circuits of the type to which the present invention relates.

Input terminal 6 of amplifier 1 is connected to control electrode 27 by resistor 30 and a high frequency by-pass capacitor 31 is connected, conveniently, from control electrode 27 to ground, or zero reference potential. Filament-type cathode 26 is connected to ground by the cathode resistor 27' that provides the cathode with a suitable positive potential, typically from 2 to 3 volts, relative to ground during normal operation of amplifier 1. Cathode 26 is also connected by resistor 32 to a source of voltage in order to provide the necessary heating current through cathode 26.

Anode electrode 28 and screen electrode 29 are connected together and to a source of positive potential by resistor 33 and variable resistor 34 which are connected in series from a source of positive potential to each of the last-mentioned two electrodes.

The second stage of amplifier 1 includes a transistor 24 having its base electrode 35 connected directly to anode 28. The collector 36 of transistor 24 is connected to a source of positive potential by resistor 37. Emitter 38 of transistor 24 is directly connected to a lower source of positive potential, than that to which collector 36 is connected by resistor 37. Transistor 24 is of the NPN type and provides amplification in a well-known manner when biased as described.

The third stage of amplifier 1 includes PNP transistor 25 having its base electrode 39 directly connected to collector 36 of transistor 24. Emitter 40 is connected to the intersection 41 of two resistors 42 and 43 that form a voltage divider network between the two sources of differing positive potential. Collector 44 is connected to a source of negative potential by resistor 45 and the output terminal 2 of amplifier 1 is directly connected to collector 44.

The circuit operation of amplifier 1 is understood by first assuming that resistor 34 has been adjusted to provide no output voltage at terminal 2 when there is no input current supplied to input terminal 7. For the sake of illustration, assume that a negative input signal to be measured is applied to terminal 7. Voltage amplifying device 23 becomes less conductive and the potential of electron collector 28 thereof increases. Base 35, of transistor 24, which is connected to electron collector 28 is accordingly raised in potential relative to its emitter 38 and is rendered more highly conductive. Thus, the potential of collector 36 decreases as does the potential of base 39, of transistor 25, which is directly connected thereto. In this way, transistor 25 becomes more highly conductive and a greater current flows through resistor 45, raising the potential of output terminal 2 of amplifier 1 in the positive direction. Thus, a negative increase in the voltage of amplifier input terminal 6 (i.e., an excursion in the negative direction) results in an increase in potential (i.e., an excursion in the positive direction) at the output terminal 2 thereof. In like manner, a positive increase in the potential at terminal 6 causes a decrease in potential of terminal 2.

As in the embodiment of FIGURE 1, essentially all of the output energy of amplifier 1 is returned to the input of amplifying device 23. To this end, amplifier output terminal 2 is connected to the junction 46 between resistors 5 and 3, by conductors 47 and 48, through current indicating instrument 4. The output signal energy fed back in this way constitutes negative feedback and essentially null-balances any external signal to be measured that is applied to electrometer input terminal 7.

In accord with the present invention, protective means are connected to the feedback path and are adapted to limit positive excursions of the negative feedback signal at least during the intervals after the circuit is energized or de-energized. Protective means 20 of FIGURE 2 (enclosed by dashed line 21) include a PNP transistor 50 that is connected to effect such protection when the circuit is de-energized, and an NPN transistor 51 that is connected to effect such protection upon energization of the circuit.

Emitter 52 of transistor 50 and collector 53 of transistor 51 are connected together and to a terminal 54 which is connected to the feedback conductor 47 by conductor 55. Collector 56 of transistor 50 and emitter 57 of transistor 51 are connected together and to terminal 58 that is connected to the aforementioned source of negative potential by conductor 59. Base 60 of transistor 50 is connected to ground by resistor 61 and is connected to terminal 62 by a capacitor 63. Base 64 of transistor 51 is connected to the emitter 57 thereof by resistor 65 and to terminal 62 by capacitor 66. Terminal 62 is connected to the higher source of positive electric potential by conductor 63', although substantially similar results are obtained when terminal 62 is connected to the lower source of positive electric potential for the aforementioned amplifying circuit.

The protective means 20 operate as follows. When the electrometer circuit of FIGURE 2 is energized, as by closing switch 72 of the power supply schematically represented as including a battery 73 and a voltage divider network 74, to establish a potential difference between respective power input terminals 67, 68 and 69, base 64 of transistor 51 is rendered positive relative to the emitter 57 thereof until capacitor 66 charges through resistor 65. During this charging interval, transistor 51 is rendered highly conductive and the negative feedback voltage is held at a negative potential substantially equal to the negative voltage supplied to power supply terminal 69. Thus, during an interval substantially determined by the charging time of capacitor 66 through resistor 65, the feedback signal is not permitted to assume a positive potential that would impair performance of amplifying device 23. Base 60 of transistor 50, on the other hand, is rendered positive with respect to its emitter 52 and is essentially non-conducting during the interval required for capacitor 63 to charge through resistor 61.

During normal operation and upon de-energization, transistor 50 effects the desired protection of amplifying device 23. Thus, during sustained operation transistor 50 is rendered conductive whenever the feedback signal causes emitter 52 of transistor 50 to become more than about 0.5 volt positive with respect to the base 60 thereof that is grounded through resistor 61. This provides a limitation upon the positive excursions permitted the negative feedback signal. Of course, greater or lesser positive excursions of the feedback signal during normal operation are permitted by connecting resistor 61 to a low impedance point, with respect to cathode 26, of positive or negative potential, respectively, with respect to ground.

When the electrometer circuit of FIGURE 2 is de-energized, either intentionally or through a power failure, the various voltages at terminals 67, 68 and 69 decay toward zero during an interval dependent primarily upon the power supply characteristics, and more particularly upon the magnitude of capacitance normally exhibited by the output of the power supply. During this interval, base 60 of transistor 50 is driven negative relative to the emitter 52 thereof and transistor 50 becomes highly conductive until the various potential decay to a negligible magnitude. During this de-energization interval the feedback signal is made substantially equal to the voltage at terminal 69 which is connected to the negative voltage source. In this way, the negative feedback signal is prevented from assuming a positive potential during de-energization that would impair future performance of amplifying device 23.

Preferably, the charging time of capacitor 66 through resistor 65 and base 64 is selected to be longer than the charging of capacitor 63 through resistor 61 in order that, upon energization, the circuit protective function is passed from transistor 51 to transistor 50 without any hiatus. To this end capacitor-charging diodes 70 and 71 are advantageously connected in parallel with resistors 61 and 65, respectively. Transistor 50 then assumes the role of protection during normal circuit operation and upon de-energization of the circuit, as discussed above.

In order to aid those skilled in the art in the practice of my invention, a particularly desirable electrometer circuit suitable for measurements in the order of $10^{-12}$ amperes, as shown in FIGURE 2 contains the following specific components.

| | | |
|---|---|---|
| R–3 | | 1000Ω |
| R–5 | | $10^{12}$Ω |
| R–27 | | 300Ω |
| R–30 | | 22 MΩ |
| R–32 | | 1500Ω |
| R–33 | | 50 KΩ |
| R–34 | | 100 KΩ |
| R–37 | | 10 KΩ |
| R–42 | | 1500Ω |
| R–43 | | 560Ω |
| R–45 | | 10 KΩ |
| R–61 | | 10 KΩ |
| R–65 | | 10 KΩ |
| C–31 | | .001 μfd |
| C–63 | | 0.25 μfd |
| C–66 | | 0.25 μfd |
| T–23 | | 5886 |
| T–24 | | 2N2349 |
| T–25 | | 2N1175 |
| T–50 | | 2N2349 |
| T–51 | | 2N1175 |
| Meter 4 | | 0–1 ma. |
| $+V_1$ | volts | +20 |
| $+V_2$ | do | +10 |
| $-V$ | do | −10 |
| Diode 70 | | 1N1692 |
| Diode 71 | | 1N1692 |

While only preferred features of the invention have been shown by way of illustration, many modifications and changes will occur to those skilled in the art. It is, therefore, to be understood that the appended claims are intended to cover all such modifications and changes as fall within the true spirit and scope of the invention.

What I claim as new and desire to secure by Letters Patent of the United States is:

1. A multiple stage hybrid direct-current amplifier comprising: an initial stage adapted to amplify direct-current input signals having a minimum magnitude at least as low as $10^{-10}$ amperes; said initial stage including an electron discharge device having, a thermionic electron emissive cathode that normally releases free electrons at a predetermined essentially constant continuous rate, an electron collector adapted to attract free electrons from said cathode at a rate that can exceed said essentially constant continuous rate to effect an undesirable semi-permanent change in the magnitude of said essentially constant continuous rate, and a control electrode adapted to limit the rate at which electrons are attracted from said cathode when the electric potential of said control electrode is less than the electric potential of said cathode; at least one succeeding stage in said amplifier having only one semiconductor amplifying element; negative feedback means establishing a negative feedback path from a succeeding stage in said amplifier to said control electrode to provide a negative feedback signal thereto during normal operation of said amplifier that essentially null-balances any external positive signal to be measured that is applied to said control electrode; means coupled to said negative feedback means and adapted to measure the magnitude of said negative feedback signal to provide an indication of the magnitude of said external signal; and, protective means coupled to said negative feedback means and adapted to limit excursions of said negative feedback signal in the direction tending to render said control electrode positive relative to said cathode at least during transient intervals when said amplifier is being energized or de-energized.

2. The hybrid direct-current amplifier of claim 1 wherein the stages of said amplifier are successively directly coupled and a plurality of the succeeding stages each employ only a single amplifying element.

3. The hybrid direct-current amplifier of claim 1 wherein said protective means comprises at least one asymmetrically conductive device having an anode and a cathode, means connecting the anode of said asymmetrically conductive device to said negative feedback path, and means connecting the cathode of said asymmetrically conductive device to a low impedance portion of the amplifier circuit that during normal operation of said amplifier is at an electric potential at least as negative as that of the cathode of said electron discharge device.

4. The hybrid direct-current amplifier of claim 1 wherein said protective means comprises an electronic switching device adapted to rapidly disable said negative feedback means in response to de-energization of said amplifier.

5. A hybrid circuit for measuring weak direct-current signals comprising: an initial amplifying stage having an evacuated voltage amplifying device including an electron-emissive cathode, a control electrode and an anode; a plurality of directly coupled succeeding amplifying stages each having only a single active amplifying element, said element being a semiconductor device; negative feedback means connected from the output of the final stage of said succeeding amplifying stages to the input of said initial stage, said negative feedback means being adapted to return essentially all of the output signal energy of said final stage to the input of said initial stage to essentially null-balance any external positive signal to be measured that is applied to the input of said initial stage; means coupled to said negative feedback means and adapted to measure the magnitude of said output signal energy to provide an indication of the magnitude of any external signal applied to said input; and, protective means connected to said feedback means and adapted to limit positive excursions of the negative feedback signal from said negative feedback means at least during a transient interval after said circuit is de-energized.

6. The hybrid direct-current amplifier of claim 1 wherein said protective means comprises first and second switching devices, each of said switching devices coupling a unidirectional voltage source to said negative feedback means; first circuit means coupled to said first switching device for momentarily decreasing impedance of said first device when power is initially applied to said amplifier; and second circuit means coupled to said second switching device for momentarily decreasing impedance of said second device when power to said amplifier is interrupted.

References Cited by the Examiner

UNITED STATES PATENTS

| | | | |
|---|---|---|---|
| 2,863,997 | 12/1958 | Dome | 330—135 |
| 2,988,699 | 6/1961 | Gardner | 324—123 |
| 3,111,627 | 11/1963 | Praglin | 328—145 |

OTHER REFERENCES

Electronics, vol. 33, No. 40, Sept. 30, 1960; pp. 94–96.

WALTER L. CARLSON, *Primary Examiner.*

J. J. MULROONEY, *Assistant Examiner.*